United States Patent [19]
Dyott

[11] Patent Number: 4,589,725
[45] Date of Patent: May 20, 1986

[54] OPTICAL-FIBER DIRECTIONAL COUPLER USING BORON OXIDE AS INTERSTITIAL MATERIAL

[75] Inventor: Richard B. Dyott, Orland Park, Ill.

[73] Assignee: Andrew Corporation, Orland Park, Ill.

[21] Appl. No.: 594,478

[22] Filed: Mar. 28, 1984

[51] Int. Cl.$^4$ .............................................. G02B 6/26
[52] U.S. Cl. .................................. 350/96.15; 65/3.14; 350/96.33; 350/96.34
[58] Field of Search ............... 350/96.15, 96.16, 96.20, 350/96.21, 96.29, 96.30, 96.33, 96.34; 65/3.12, 3.14

[56] References Cited

U.S. PATENT DOCUMENTS

| | | | |
|---|---|---|---|
| 3,966,446 | 6/1976 | Miller | 350/92.29 X |
| 4,179,189 | 12/1979 | Kaminow et al. | 350/96.33 |
| 4,315,666 | 2/1982 | Hicks, Jr. | 350/96.15 |
| 4,387,954 | 6/1983 | Beasley | 350/96.15 |
| 4,474,431 | 10/1984 | Bricheno | 350/96.15 |
| 4,493,528 | 1/1985 | Shaw et al. | 350/96.15 |

FOREIGN PATENT DOCUMENTS 56-97303  8/1981  Japan .................. 350/96.34

OTHER PUBLICATIONS

Schöner et al., "Novel Method for Making Single-Mode Optical Fibre Directional Couplers", *Electronics Lett.*, vol. 18, No. 13, Jun. 1982, pp. 566–568.

*Primary Examiner*—John Lee
*Attorney, Agent, or Firm*—Leydig, Voit & Mayer, Ltd.

[57] ABSTRACT

An evanescent-field coupler for an optical fiber having a core and a cladding forming a guiding region located sufficiently close to the surface of the fiber along a selected length thereof to allow evanescent-field coupling of an optical signal from the guiding region to an optical fiber or other device outside the guiding region, the cladding consisting essentially of silica, the coupler comprising a vitreous layer of amorphous boron oxide or a boron oxide compound fused to the cladding and having an index of refraction substantially matching the index of refraction of the cladding.

19 Claims, 12 Drawing Figures

OPTICAL-FIBER DIRECTIONAL COUPLER USING BORON OXIDE AS INTERSTITIAL MATERIAL

FIELD OF THE INVENTION

The present invention relates generally to the field of fiber optics and, more particularly, to optical fiber couplers of the evanescent-field type. This invention is especially useful in single-mode directional couplers for use in interferometric sensors, mixers for heterodyne or homodyne receivers, and the like.

DESCRIPTION OF THE PRIOR ART

The field of fiber optics is generally concerned with the transmission of light along a transparent fiber structure or core which has a higher refractive index than its surroundings. Normally, an optical fiber consists of a core of transparent material having a refractive index $n_1$ surrounded by a layer of transparent cladding material having a refractive index $n_2$ which is lower than $n_1$. Typically, the optical fiber also includes an outer protective layer. By limiting wave propagation through the fiber to a single mode, the bandwidth of the optical fiber may be exceedingly high to provide a high information-transfer capacity.

While multimode optical fiber sensor systems use amplitude variations in the optical signals to sense and transmit the desired information, single-mode sensor systems use phase variations rather than amplitude variations. The single-mode systems usually involve mechanisms for altering such properties of the fiber as path length or index of refraction to effect the desired phase variations in the optical signal.

Single-mode sensors are sensitive to the state of polarization of the light in the fiber. If the fiber is not significantly polarization-holding or preserving, the state of polarization at the detector will tend to fluctuate randomly. Thus, for single-mode transducers, it is desirable to use elliptical-core or other kinds of polarization-holding fiber. See, e.g., McMahon et al., "Fiber-Optic Transducer", *IEEE Spectrum*, December 1981, pages 24–27.

It is a principal object of the present invention to provide an improved evanescent-field optical coupler which provides insertion losses below 0.5 dB over a relatively wide bandwidth (as low as 0.1 dB at certain wavelengths) in combination with good polarization-holding properties.

A further object of the present invention is to provide an improved evanescent-field optical coupler of the foregoing type which also has good thermal stability over a wide temperature range.

Still another object of this invention is to provide such an improved evanescent-field optical coupler which has good structural integrity and reliable operating characteristics over a long operating life.

A still further object of this invention is to provide such an improved evanescent-field optical coupler which is capable of providing virtually any desired power division across the coupler. In this connection, a related object of the invention is to provide such an improved optical coupler which can be "tuned" to a selected power-split ratio at a desired operating wavelength.

A still further object of this invention is to provide an improved method of making optical couplers of the foregoing type which facilitates alignment of the guiding regions being coupled, and which permits efficient and economical fabrication of the couplers.

Other objects and advantages of the invention will be apparent from the following detailed description and the accompanying drawings.

Figure 1:
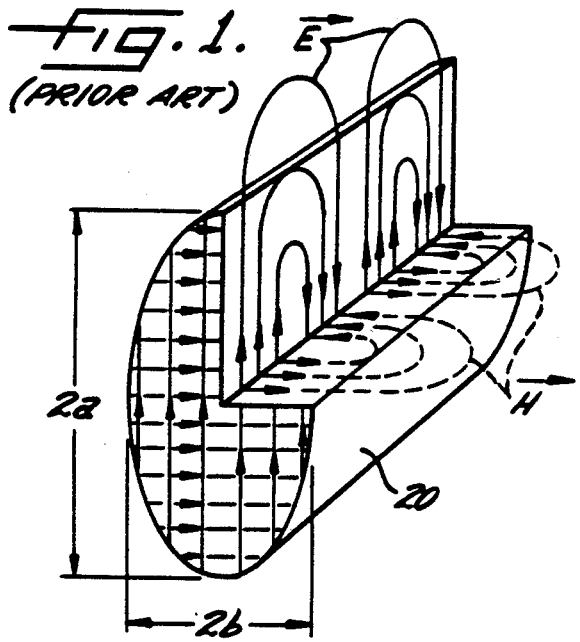
FIG. 1, labelled PRIOR ART, is a diagrammatic perspective view, in partial section, illustrating the electric and magnetic fields in their preferred directions of polarization in the elliptical core of a single-mode optical fiber waveguide.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to FIG. 1, there is shown a dielectric core 20 for supporting the propagation of electromagnetic fields $\bar{E}$, $\bar{H}$ in the axial direction. This particular core 20 has an elliptical cross-section with a major diameter $2a$ and a minor diameter $2b$. A single-mode optical fiber has such a core 20 with a relatively high dielectric constant/index of refraction which tends to confine and guide electromagnetic energy (i.e., light) along the axis of the core. It is known that if the index of refraction of the core 20 is properly chosen in relation to the index of refraction of the surrounding medium, the core dimensions a, b, and the wavelength of the light, the distribution of the fields $\bar{E}$, $\bar{H}$ will tend to occur in a single, well-defined pattern, or mode. Shown in FIG. 1 is the field pattern for the $_0HE_{11}$ mode.

Single-mode propagation has the advantage of providing well-defined field patterns for coupling the fiber to optical devices. Another advantage is that the attributes of the light propagation, such as phase velocity and group velocity, are relatively constant as the light propagates down the fiber. The group velocity specifies how fast modulation or information travels down the fiber. Thus, for transmitting information over long distances it is important that the group velocity be relatively constant and in particular independent of frequency so that the information will be localized at a specific region rather than becoming "smeared out" as the information travels down the fiber. A constant phase velocity is important in fiber-optic sensor applications where the phase of a signal in a sensor fiber is compared to the phase of a reference signal in a reference fiber.

Single-mode propagation does not, however, guarantee that the polarization of the signal is fixed in any definite or constant angular relationship with respect to the core 20. Polarization is defined as the direction of the electric field vector $\bar{E}$. Thus, as shown in FIG. 1, the light is polarized in a vertical direction.

Figure 2:
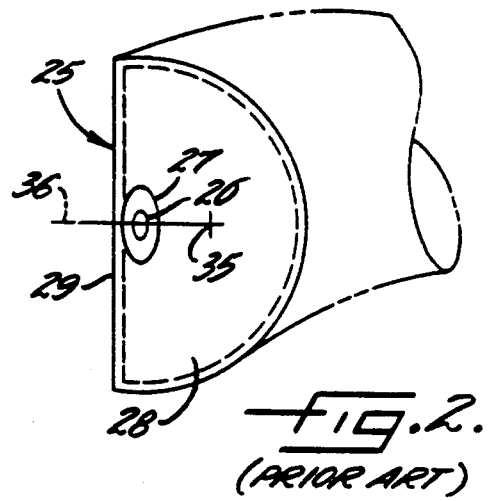
FIG. 2 is an end view of the D-shaped optical fiber waveguide made according to one preferred method of the present invention.

In the illustrative embodiment of FIG. 2, an optical fiber 25 has an elliptical core 26 with a relatively high index of refraction surrounded by a cladding 27 with a lower index of refraction. For example, the core 26 is typically composed of germania-doped silica having a refractive index n of 1.50, while the cladding 27 is silica doped with flourine and having a refractive index of 1.45, both at a typical wavelength of 850 nm. The dimensions and the refractive indices of the core 26 and the cladding 27 are selected to provide a single-mode guiding region. Because of its elliptical shape, this guiding region holds the polarization of optical signals propagated therethrough in alignment with either axis of the ellipse. That is, the major and minor axes of the elliptical cross-section represent two transverse orthogonal axes which permit the decoupling of waves polarized along those axes.

Surrounding the guiding region formed by the core 26 and cladding 27 is a support layer 28 which provides the fiber with increased mechanical strength and ease of manipulation. Since this support layer 28 is not a part of the guiding region, its optical properties are not nearly as critical as those of the core 26 and the cladding 27. To prevent light from being trapped in the cladding 27, the support layer has an index of refraction higher than that of the cladding 27.

As can be seen in FIG. 2, by removing a thin portion of the support layer 28, and also a portion of the cladding 27 if necessary to achieve the desired degree of coupling (e.g., by etching to the dashed contour in FIG. 2), the guiding region formed by the core 26 and cladding 27 can be located sufficiently close to the surface of the fiber to allow coupling to a guided wave. As an alternative, a selected segment of the fiber can be drawn to reduce the fiber diameter within that segment and thereby expand the field of the guiding region to permit the coupling of guided waves to and from the guiding region in that segment of the fiber.

The outer surface of the fiber as defined by the support layer 28 in FIG. 2 has a D-shaped cross-section, with the flat surface 29 of the D extending parallel to the major axis of the elliptical guiding region on the side of the fiber closest to the guiding region. This D-shape of the optical fiber permits the axes of the elliptical core 26 to be precisely aligned with a second fiber of the same shape, or with a polarization-sensitive optical device, by using the flat surface 29 of the D as an indexing surface.

The guiding region of the D-shaped fiber 25 of FIG. 2 is preferably offset or displaced from the geometric center 35 (i.e., centroid of mass or center of gravity of the transverse section) toward the flat 29 of the D along the perpendicular-bisector 36 of the flat. Preferably, the guiding region is located within a few average core diameters of the flat surface 29 so that the outer surface of a portion of the fiber may be etched to expose the guiding region at the surface 29, thereby permitting the transmission or gradual exchange of light between the guiding region and the fiber surface in the evanescent field in the cladding 27. For example, the guiding region can be located within about three average core diameters of the flat surface 29. For the elliptical core 20, the average core diameter is the sum (a+b) of the major and minor radii.

The fact that the flat surface 29 of the D is within a few average core diameters of the guiding region does not affect the attenuation or loss of the fiber since the flat surface 29 is not within the cladding 27. Although there is some light propagated within the cladding 27, substantially no evanescent field reaches the support layer 28 which forms the flat 29 of the D. But if an etchant such as hydrofluoric acid is applied to the outer surface of the fiber along a selected length, the flat surface 29 will be moved inwardly (e.g., to the dashed contour shown in FIG. 2), thereby allowing energy to pass between the core 26 and the flat surface 29 via the cladding 27. A fiber with a central core is difficult to etch in this fashion since there may not be any supporting layer remaining after the etching process.

Figure 3:
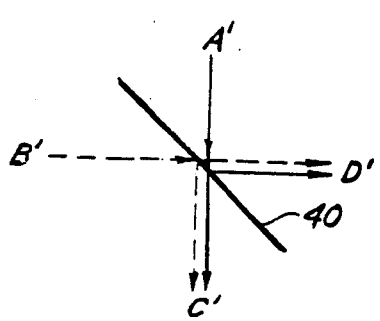
FIG. 3, labelled PRIOR ART, illustrates an optical beam splitter.

Directional couplers are the fiber-optic equivalents of optical beam splitters and are indispensable elements for making single-mode fiber-optic transducers. A beam splitter 40 is schematically shown in FIG. 3. The beam splitter 40 is essentially a partially silvered mirror which transmits a portion of the incident light and reflects the rest. A source of incident light A' is usually directed at 45° with respect to the plane of the beam splitter 40 so that the incident beam A' is split into a transmitted beam C' and a reflected beam D'. In addition to the beam-splitting function, the beam splitter 40 is also used to combine two incident beams A', B'. The incident beam B', shown in dashed representation, may also be directed at 45° with respect to the plane of the beam splitter 40 and at right angles to the incident beam A' so that the output beams C' and D' are combinations of the incident beams A' and B'.

Figure 4:
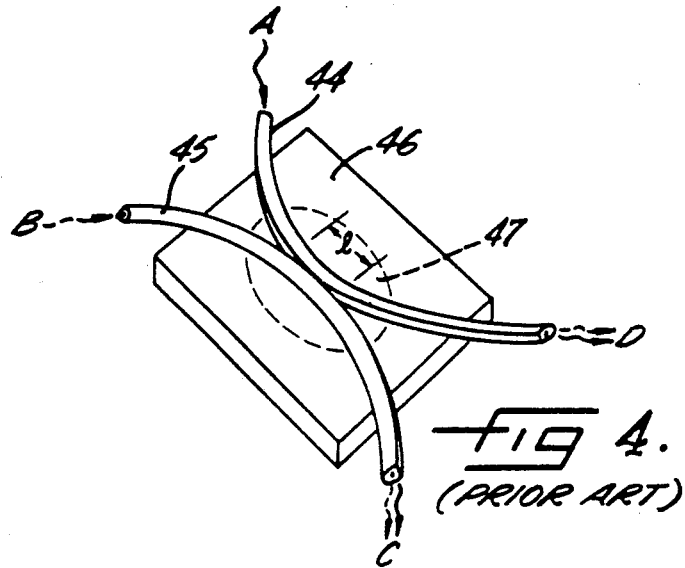
FIG. 4 is a perspective view of a fiber-optic directional coupler.

There is shown in FIG. 4 an exemplary fiber-optic directional coupler comprised of two D-shaped optical fibers 44, 45, like the fiber 25 of FIG. 2, positioned adjacent each other on a flat substrate 46. The flat surfaces of the fibers 44, 45 contact each other along etched lengths l, and their guiding regions are aligned to permit the gradual exchange of energy between the guiding regions along the length l of the fibers. In the particular embodiment illustrated, alignment of the guiding regions of the fibers 44, 45 is facilitated because the D-shaped fibers 44, 45 are curved rather than straight in their unstressed configuration, with the flats of the D's located on the convex surfaces of the curved fibers. Some sort of interstitial index-matching material is usually needed between the fibers to avoid the rapid falloff in field (hence coupling) that would be caused by an air gap.

Figure 5:
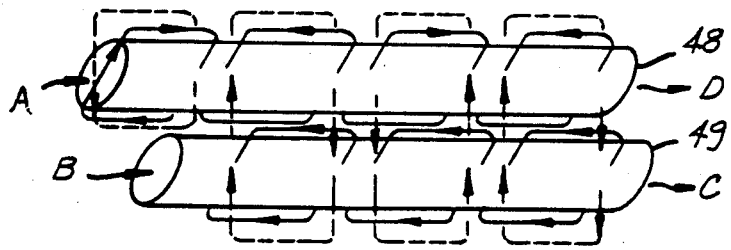
FIG. 5 is a schematic perspective view of the active area of the directional coupler of FIG. 4, showing the exchange of electromagnetic energy from the core of one fiber of the coupler to the core of the other fiber.

The operation of the directional coupler of FIG. 4 is best understood in terms of an exchange or transfer of the electromagnetic fields $\bar{E}$, $\bar{H}$ propagating down the cores 48, 49 of the respective fibers 44, 45 as shown in FIG. 5. The fields of the two fibers overlap to some extent so that a portion of the electromagnetic field energy in the incident signal A is gradually transferred from one core 48 to the other core 49. The overlapping region must be kept short enough so that the phase relationship necessary for energy transfer is maintained. In general, the relative amount of energy from signal A that is transferred from one core 48 to the other core 49 is proportional to the amount of coupling per unit length and the length l over which the coupling occurs.

Figure 6:
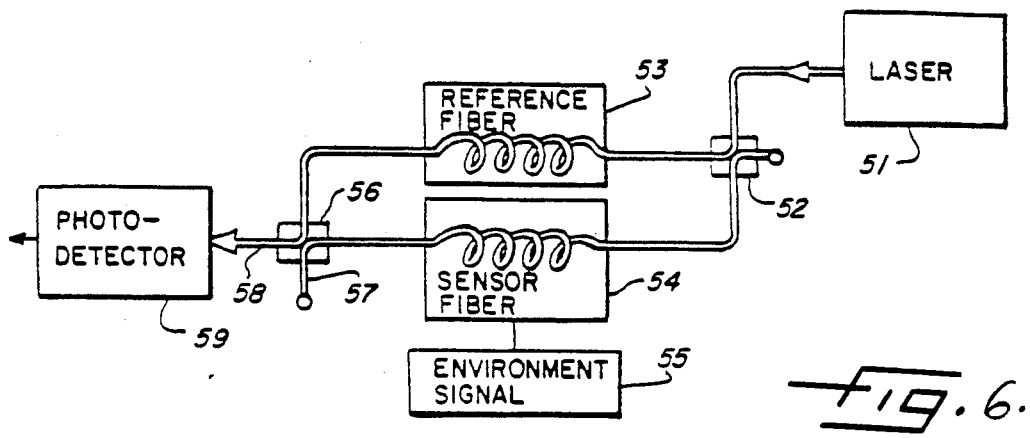
FIG. 6 is a schematic diagram of a single-mode fiber-optic sensor using continuous sensor and reference fibers and directional couplers integral with the fibers.

Directional couplers are used in devices such as single-mode interferometer sensors and fiber gyros. A generalized schematic diagram of a single-mode interferometer sensor using optical fibers and directional couplers according to the present invention is shown in FIG. 6. A coherent source of light such as a laser 51 emits light into an incident port of a directional coupler 52. The directional coupler 52 acts as a beam splitter and sends half of the light into a reference fiber 53 and the other half into a sensor fiber 54. The sensor fiber 54 is coupled to the environment so that the phase of the light in the sensor fiber is modulated by a desired environment signal 55 by the time the light reaches a second directional coupler 56. This second directional coupler 56 accepts the light transmitted through the reference fiber 53 and the light transmitted through the sensor fiber 54 as incident signals, and acts as a combiner. Combined signals appear at two output ports 57, 58, one of which (57) is terminated (preferably with substantially no reflections) and the other of which (58) is fed to a photodetector 59.

The photodetector 59 is responsive only to the amplitude of the detected signal at the output port 58. The "beat phenomenon" generates a null in the relative response of the photodetector 59 when the phase difference is 180°, or one-half of a wavelength of the coherent light. For maximum sensitivity, the null should be very sharp. But to get a sharp null, the sensor fiber signal and the reference fiber signal each must be phase coherent, and they must have equal amplitudes. The signals will be phase coherent if they propagate as single modes in the sensor and reference fibers. The amplitudes will be equal if half of the light 58 reaching the photodetector 59 passes through the reference fiber 53 and the other half passes through the sensor fiber 54. These proportions are set predominantly by the coefficient of coupling of the directional couplers 52 and 56, so it is important that these couplers have coefficients of coupling that are precisely defined and stable.

In accordance with one important aspect of the present invention, an improved evanescent-field coupler is provided for an optical fiber having a cladding of silica or doped silica, the coupler comprising a vitreous layer of amorphous boron oxide or a boron-oxide compound fused to the cladding and having an index of refraction substantially matching the index of refraction of the cladding. This invention stems in part from the discovery that boron oxide is uniquely suitable for use as an evanescent-field coupling medium for two optical guiding regions made of silica (doped or undoped). More specifically, boron oxide:

(1) has an index of refraction $n_b$ of 1.417, which is just slightly below silica's index of refraction $n_s$ of 1.453 (both indices at a wavelength of 850 nm.);
(2) has an amorphous form which readily fuses to or alloys with silica at a temperature which does not melt the silica;
(3) is capable of being doped to controllably alter its index of refraction, thereby permitting precise tuning of a coupler containing the boron oxide to achieve any desired division of power across the coupler;
(4) has excellent glass lubricating properties in its molten state, thereby facilitating alignment of the optical fibers or other devices being coupled;
(5) has good optical transmission and polarization-holding properties; and
(6) can be used over a wide range of wavelengths, ranging from ultraviolet down to 1.7 microns; although boron oxide absorbs light at wavelengths below about 1.1 microns, the layer of boron oxide between the two fibers is so thin that the absorption in the coupling region is negligible.

As a result of boron oxide's unique combination of properties, it permits optical couplers to be made with insertion losses below 0.5 dB over a relatively wide bandwidth (as low as 0.1 dB at certain wavelengths); with good polarization-holding properties; with good thermal stability over a wide temperature range, e.g., 0.01 nm./C° over a range from room temperature to 300° C.; with good structural integrity and reliable operating characteristics over a long operating life; and with virtually any desired power division across the coupler at a desired operating wavelength. In addition, the boron oxide offers significant manufacturing advantages and economies by facilitating precise alignment of the guiding regions and polarization planes of the optical fibers or other devices being coupled, and by permitting facile and accurate control of the power division across the coupler over a relatively wide bandwidth.

One method of forming the coupler of this invention from a pair of fibers 44 and 45 comprises the following steps: (1) preparing a portion of the surfaces of the optical fibers in a manner to allow for evanescent-field coupling between the fibers; (2) coating the prepared surfaces of the fibers with a vitreous layer of amorphous boron oxide ($B_2O_3$); (3) disposing the prepared surfaces within a glass tube which loosely holds the selected segments of the fibers in place; (4) heating the fibers in the area of the prepared surfaces to soften the boron oxide sufficiently to cause it to flow over the prepared surfaces; (5) increasing the temperature of the prepared surfaces to melt the boron oxide between the fibers and between the fibers and the tube; and (6) cooling the fibers and the tube to solidify the boron oxide in an amorphous state which is fused to or alloyed with the prepared fiber surfaces. In the preferred embodiment of this method, the optical fibers are the D-shaped fibers described above, and the fibers are prepared for the boron oxide coating by etching the fiber surfaces as described above in connection with FIG. 2. In this method, the fibers are positioned in the glass tube with the flats of the D's facing each other.

As an alternative to the etching process, the fiber surfaces can be prepared for the boron oxide coating by drawing the fibers so as to expand the field of the guiding region farther into the cladding of the fiber.

Figure 7:
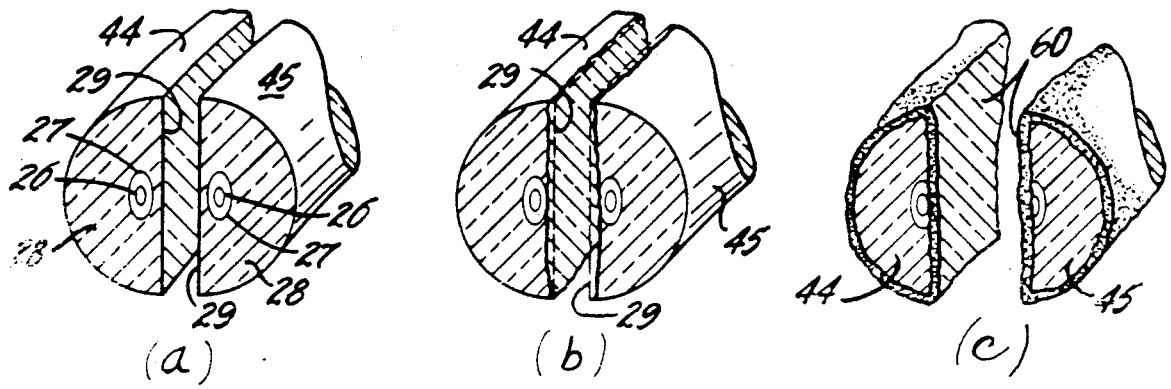
FIGS. 7a through 7e are fragmentary and partially diagrammatic perspective views illustrating successive steps in the fabrication of an optical coupler according to one embodiment of the invention.
Figure 7:
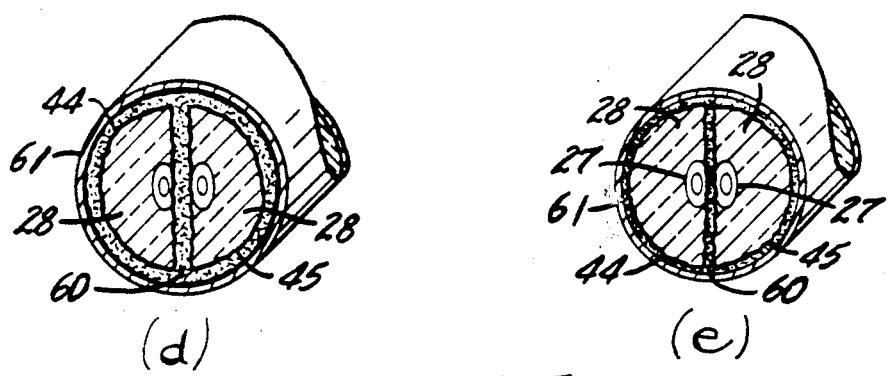

According to an exemplary method illustrated in FIGS. 7(a)-7(e), a pair of D fibers 44 and 45 (FIG. 7a) are etched (FIG. 7b) and then coated with boron oxide 60 (FIG. 7c). This coating can be effected by placing a small amount of boron oxide powder on a platinum wire loop (not shown) which is then heated by passing a current through the loop, thus causing the boron oxide 60 to melt on the wire loop. Surface tension causes the molten boron oxide to remain on the wire loop. The optical fibers 44 and 45 are then guided over an edge of the platinum loop in order to transfer the molten boron oxide 60 to the etched surfaces of the fibers. Preferably, the boron oxide 60 is applied to both optical fibers, and along a length in excess of the desired coupling length l; this ensures that the entire etched areas of the two fibers are covered by the boron oxide 60.

After the optical fibers 44 and 45 have been coated with the boron oxide 60, the coated portions of the fibers are cooled to solidify the boron oxide and then pulled into a sodium borosilicate glass tube 61 (FIG. 7d). The glass tube 61 and the coated segments of the optical fibers 44 and 45 therein are then heated to a temperature slightly in excess of 100° C. in order to drive off any moisture present. After sufficient time has passed to ensure that no moisture is present inside the tube 61, the temperature is raised to 450°-500° C. to soften both the boron oxide 60 and the sodium-borosilicate tube 61 The boron oxide flows at this temperature, and thus heating the tube and fibers to this temperature ensures that the boron oxide completely surrounds the fiber segments within the tube, as shown in FIG. 7d.

After the softened boron oxide 60 has had sufficient time to flow at the raised temperature of 450°-500° C., the temperature is raised to 800°-900° C. and tension is applied to the glass tube 61. This increased heating melts the boron oxide and causes the sodium borosilicate glass tube 61 to soften, while the tension causes the tube to "neck in" and squeeze the D fibers together, as shown in FIG. 7e. In this molten state the boron oxide 60 serves to lubricate the surfaces of the two optical fibers 44 and 45, thereby facilitating alignment of the flat surfaces of the two fibers as the fibers are squeezed together within the tube 61. Without this lubrication the fibers 44, 45 can become "hung up" on each other or on the walls of the glass tube 61, resulting in misalignment and/or induced stress in the etched segments of the fibers.

One of the advantages of this method of forming the coupler is that it permits the boron oxide to be easily doped with metal ions for "tuning" the coupler to a desired operating wavelength and power-split ratio. For example, when the glass tube 61 is made of sodium borosilicate glass, the boron oxide can be doped with sodium ions by "soaking" the coupler at the 800°-900° C. temperature range. This "soaking" is carried out for a controlled time period that is long enough to permit the concentration of sodium ions in the boron oxide to reach a level which provides the boron oxide with the desired index of refraction.

Another exemplary method of forming the optical coupler of this invention utilizes vapor deposition to cover the exposed silica cladding with boron oxide or a boron oxide compound. To vaporize the boron oxide, it is heated to a temperature of approximately 1200° C. The resulting boron oxide vapor is brought into contact with the etched surfaces of the fibers, which are maintained at a temperature above the melting point (450° C.) of boron oxide but below its boiling point. Then as the boron oxide continues to cool, it solidifies to form an amorphous, glassy coating which is fused to (or alloyed with) the etched surface of the cladding. The resulting coupler can then be inserted in a tube which is sealed at the ends with epoxy resin to protect the boron oxide from moisture pickup.

To facilitate alignment of the etched segments of the fibers while the boron oxide vapor is being deposited thereon, these segments of the fibers are preferably coated with a volatile liquid such as ethyl alcohol. The surface tension of this liquid tends to hold the flat surfaces of the fibers, which are already positioned close to each other, in register with each other. As the hot boron oxide vapors contact the ethyl alcohol, the latter is vaporized and driven off so that the boron oxide condenses directly onto the solid fiber surfaces. Volatile liquids other than ethyl alcohol may be used for this purpose, provided they do not leave any deleterious residue on the fiber surfaces.

This vapor deposition process also permits the boron oxide to be doped with metal ions for the "tuning" purposes described above. For example, instead of vapor depositing pure boron oxide, the boron oxide vapor may be mixed with vapor from a glass-forming compound of a higher refractive index, such as sodium tetraborate ($Na_2B_4O_7$). By controlling the ratio of boron oxide to sodium tetraborate, the sodium content of the resultant coating can be accurately controlled to produce the desired index of refraction.

The vapor deposition process offers the advantage of not requiring the application of tension to the glass tube that encases the coupled fibers, because the fibers can be readily aligned without the aid of the tube. Consequently, the fibers being coupled can have a lower index differential between the core and the cladding, because no stresses are introduced into the fibers due to tension applied to the surrounding tube.

In a working example of the invention, tests were conducted on a directional coupler made from D fiber having an elliptical core with a major axis of 2 $\mu$m and a minor axis of 1 $\mu$m. The index difference between the core and cladding of the fiber was 0.05 at a wavelength of 830 mm. Two of these fibers were etched over a length of about 3 mm. to an extent that the flat of the D in each etched sections was 2 $\mu$m from the center of the elliptical core. The flats of the D's of the etched fibers were brought together and held by surface tension with a small quantity of ethyl alcohol applied to the fibers. Boron oxide was then evaporated onto the contiguous etched regions, using the method described above. After coating with boron oxide, the fibers were protected by a glass tube which was positioned over the coupling region and sealed at both ends with an epoxy resin.

Figure 8:
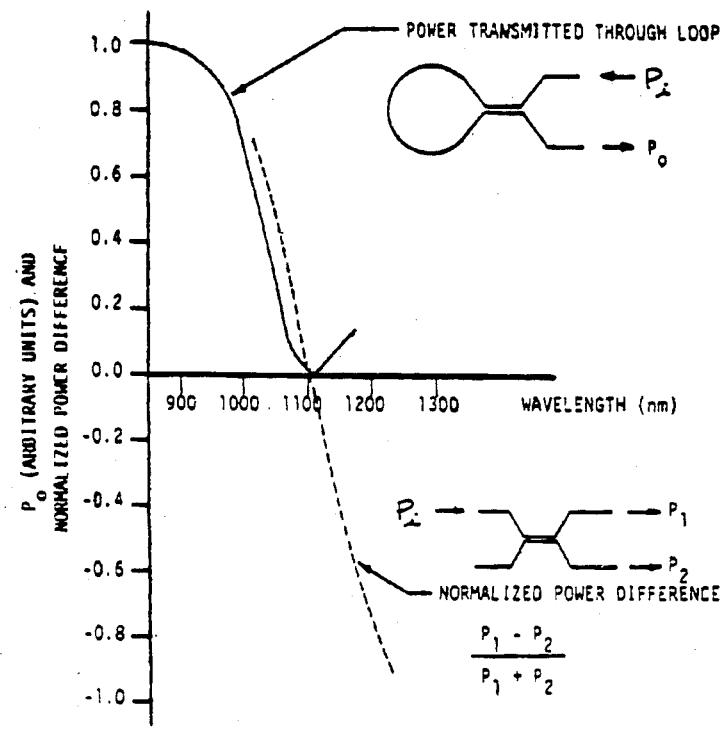
FIG. 8 is a pair of graphs illustrating the results of two different tests conducted on a directional coupler according to one embodiment of the invention.

In one test, this coupler was tested with the fibers at one end forming a closed loop, as illustrated by the schematic diagram in the upper portion of FIG. 8. At the other end of the coupler, a signal was fed into one fiber at a known power level $P_i$ at several different wavelengths, and the power level $P_o$ of the return signal in the other fiber was measured at each wavelength. The resulting measurements of $P_o$ were plotted as a function of wavelength, which is the solid-line curve in FIG. 8. As can be seen from this curve, the value of $P_o$ varied from a value of one at a wavelength of about 850 nm., which produced zero coupling, to zero at a wavelength of about 1100 nm., which produced 50% coupling. The return signal goes to zero when there is a 50—50 power split at the coupler because the signal is delayed by a phase shift of 90° when it is coupled from one fiber to the other; thus, the signal that follows the anti-clockwise path in FIG. 8 is delayed by a phase shift of 180° since it passes across the coupler twice, while the signal that follows the clockwise path never passes across the coupler and, therefore, has a zero phase shift. Consequently, when the coupler produces a 50—50 power split, the output of the return arm is zero, producing a signal null at the detector connected to that arm.

In a second test, the coupler was tested with the loop broken, as illustrated by the schematic diagram in the lower portion of FIG. 8. At one end of the coupler a signal was fed into one fiber at a known power level $P_i$ at several different wavelengths, and the power levels $P_1$ and $P_2$ of the output signals in the fibers at the other end of the coupler were measured at each wavelength. The resulting measurements were plotted as the normalized power difference, i.e. $(P_1-P_2)/(P_1+P_2)$ as a function of wavelength, which is the broken-line curve in FIG. 8. As can be seen from this curve, the normalized power difference varies from plus one when 100% of the signal is detected at $P_1$, to zero when the power split between $P_1$ and $P_2$ is 50—50, to minus one when 100% of the signal is detected at $P_2$.

The insertion loss of this coupler was generally less than 0.2 dB. Polarization holding was measured through the coupler using a band-limited incoherent source in a method described in Rashleigh, S. C., Burns, W. K., Moeller, R. P. and Ulrich, R.: "Polarization Holding in Birefringent Single-mode Fibers", Optics Letters, Vol. 7, No. 1, pp. 40-2, January 1982, for measuring the polarization holding in birefringent fibers. The extinction ratio (power in wanted polarization/power in orthogonal polarization) in the coupled arm was typically 15 dB.

As can be seen from the foregoing detailed description, this invention provides an improved evanescent-field optical coupler which provides insertion losses below 0.5 dB over a relatively wide bandwidth in combination with polarization-holding properties. At certain wavelengths the insertion loss is as low as 0.1 dB. This improved coupler has good thermal stability over a wide temperature range, and also has good structural integrity and reliable operating characteristics over a long operating life. This coupler is capable of providing virtually any desired power division across the coupler, and can be finally "tuned" to a selected power-spread ratio at a desired operating wavelength. These couplers can be made by methods which facilitate alignment of the guiding regions being coupled, and which permit efficient and economical fabrication of the couplers.

I claim as my invention:

1. An evanescent-field coupler for an optical fiber having a core and a cladding forming a guiding region located sufficiently close to the surface of the fiber along a selected length thereof to allow evanescent-field coupling of an optical signal from said guiding region to an optical fiber or other device outside said guiding region, the cladding consisting essentially of silica, said coupler comprising a vitreous layer of amorphous boron oxide or a boron-oxide compound fused to said cladding and having an index of refraction substantially matching the index of refraction of said cladding.

2. An evanescent-field coupler as set forth in claim 1 wherein said amprphous boron oxide is doped with a material that raises its index of refraction to a value equal to or just slightly below the value of the index of refraction of said cladding.

3. An evanescent-field coupler as set forth in claim 2 wherein said amorphous boron oxide is doped with sodium.

4. An evanescent-field coupler as set forth in claim 1 wherein said core and cladding have different refractive indices and form a single-mode guiding region, said core having a non-circular cross-section defining two transverse orthogonal axes which, in combination with said different refractive indices, permit the de-coupling of waves polarized along said axes, said guiding region being located sufficiently close to the surface of the fiber, along a selected length of the fiber, to allow coupling to a guided wave, the outer surface of the fiber having a non-circular cross-section with a predetermined geometric relationship to said guiding region and said orthogonal transverse axes so that the location of said guiding region and the orientation of said axis can be ascertained from the geometry of said outer surface.

5. An evanescent-field coupler as set forth in claim 4 wherein said core has an elliptical cross-section.

6. An evanescent-field coupler as set forth in claim 4 wherein the portion of said outer surface that is closest to said guiding region is substantially parallel to one of said transverse axes.

7. An evanescent-field coupler as set forth in claim 4 which includes a support layer surrounding said guiding region and forming said non-circular outer surface of the fiber.

8. An evanescent-field coupler as set forth in claim 4 wherein the outer surface of the fiber has a generally D-shaped cross-section.

9. An evanescent-field coupler for a pair of optical fibers each having a core and a cladding forming a guiding region located sufficiently close to the surface of the fiber along a selected length thereof to allow evanescent-field coupling of an optical signal from said guiding region to the other optical fiber, the claddings of both fibers consisting essentially of silica, said coupler comprising a vitreous layer of amorphous boron oxide or a boron-oxide compound fused to the claddings of both fibers and having an index of refraction substantially matching the index of said claddings.

10. An evanescent-field coupler as set forth in claim 9 wherein said amorphous boron oxide has an index of refraction just slightly below the index of said claddings.

11. An evanescent-field coupler for an optical fiber having a core and a cladding forming a guiding region located sufficiently close to the surface of the fiber along a selected length thereof to allow evanescent-field coupling of an optical signal from said guiding region to an optical fiber or other device outside said guiding region, the cladding consisting essentially of silica, said coupler comprising a vitreous layer of amorphous boron oxide or a boron-oxide compound fused to said cladding and having an index of refraction slightly below the index of refraction of said cladding.

12. An evanescent-field coupler for a pair of optical fibers each having a core and a cladding forming a guiding region located sufficiently to the surface of the fiber along a selected length thereof to allow evanescent-field coupling of an optical signal from said guiding region to the other optical fiber, the claddings of both fibers consisting essentially of silica, said coupler comprising a vitreous layer of amorphous boron oxide or a boron-oxide compound fused to the claddings of both fibers and having an index of refraction slightly below the index of said claddings.

13. A process of forming an evanescent-field coupler for an optical fiber having a core, a cladding forming a guiding region located sufficiently close to the surface of the fiber along a selected length thereof to allow evanescent-field coupling of an optical signal from said guiding region to an optical fiber or other device outside said guiding region, and a support layer outside the cladding, said cladding consisting essentially of silica, said process comprising:

removing said support layer from a selected area of the fiber to expose the silica cladding, covering the exposed cladding with a layer of molten boron oxide or a molten boron-oxide compound as a coupling medium, positioning a second optical fiber or other optical device in a desired position of alignment with the first fiber and in contact with said layer of molten boron oxide or boron oxide compound, and solidifying the boron oxide or boron oxide compound to an amorphous state which is bonded to or alloyed with said first optical fiber and said second optical fiber or other optical device.

14. A process as set forth in claim 13 wherein said layer of molten boron oxide or boron-oxide compound is formed by vapor deposition of boron oxide onto said exposed cladding.

15. A process as set forth in claim 14 wherein said cladding is maintained at a temperature above the melting point of boron oxide during said vapor deposition so that the deposited boron oxide or boron-oxide compound is maintained in a molten state on the fiber surface.

16. A process as set forth in claim 13 wherein said first and second optical fibers are positioned by feeding the fibers through a glass tube with the exposed silica claddings of the two fibers facing each other within the galss tube to define the interaction length of the coupler, and including the steps of heating the glass tube to its softening point, and
collapsing the softened glass tube against the fibers therein to urge said fibers against each other.

17. A process as set forth in claim 16 wherein the glass tube is heated to a temperature high enough to not only soften the glass tube but also cause the boron oxide or boron-oxide compound to flow.

18. A process as set forth in claim 16 which includes the step of applying tension to said glass tube while the tube is softened and while the boron or boron-oxide compound is molten, to reduce the inside diameter of the tube and thereby squeeze the fibers therein together.

19. A process as set forth in claim 16 wherein said glass tube is made of sodium borosilicate glass, and said coupling medium is doped with sodium by maintaining the glass tube at an elevated temperature for a controlled time period.

* * * * *